US011519936B2

(12) United States Patent
Hirade (10) Patent No.: US 11,519,936 B2
(45) Date of Patent: Dec. 6, 2022

(54) SCANNING PROBE MICROSCOPE AND SCANNING PROBE MICROSCOPE OPTICAL AXIS ADJUSTMENT METHOD (71) Applicant: Shimadzu Corporation, Kyoto (JP)

(72) Inventor: Masato Hirade, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/294,998

(22) PCT Filed: Jul. 3, 2019

(86) PCT No.: PCT/JP2019/026489
§ 371 (c)(1),
(2) Date: May 18, 2021

(87) PCT Pub. No.: WO2020/105213
PCT Pub. Date: May 28, 2020

(65) Prior Publication Data
US 2022/0018873 A1 Jan. 20, 2022

(30) Foreign Application Priority Data
Nov. 20, 2018 (JP) .............................. JP2018-217360

(51) Int. Cl.
*G01Q 20/02* (2010.01)
(52) U.S. Cl.
CPC .................................. *G01Q 20/02* (2013.01)
(58) Field of Classification Search
CPC ...................................................... G01Q 20/02
USPC ....................................... 850/1, 2, 3, 4, 5, 6
See application file for complete search history.

(56) References Cited

U.S. PATENT DOCUMENTS

| 2010/0064396 A1* | 3/2010 | Nakata | G01Q 60/22 |
| | | | 850/30 |
| 2011/0099673 A1 | 4/2011 | Kasai et al. | |
| 2016/0282383 A1 | 9/2016 | Yamamoto | |
| 2017/0059609 A1 | 3/2017 | Watanabe et al. | |

FOREIGN PATENT DOCUMENTS

| JP | 08-220109 A | 8/1996 |
| JP | 2000346782 A | 12/2000 |
| JP | 2007003246 A | 1/2007 |

(Continued)

OTHER PUBLICATIONS

PCT Written Opinion of the International Searching Authority (Form PCT/ISA/237) for PCT application No. PCT/JP2019/026489 dated Aug. 27, 2019.

*Primary Examiner* — Nicole M Ippolito
(74) *Attorney, Agent, or Firm* — Muir Patent Law, PLLC (57) ABSTRACT

A scanning probe microscope is provided with a cantilever having a probe at a tip end thereof, an optical system for emitting laser light onto the cantilever and detecting the laser light reflected by the cantilever, an imaging unit for imaging a range including a position of the tip end of the cantilever when adjusting an optical axis of the laser light, an image processing unit for detecting a position of the tip end of the probe and a position of a spot of the laser light from an image generated by the imaging unit, an optical axis adjustment unit for adjusting the optical axis of the laser light based on the detected positions, and a sample holder for holding a sample. The sample holder includes a mirror.

1 Claim, 8 Drawing Sheets

(56) References Cited

FOREIGN PATENT DOCUMENTS

| JP | 2011521202 A | 7/2011 |
|----|--------------|--------|
| JP | 2016183869 A | 10/2016 |
| JP | 2017049087 A | 3/2017 |
| JP | 2017049087 A | 8/2018 |

* cited by examiner

SCANNING PROBE MICROSCOPE AND SCANNING PROBE MICROSCOPE OPTICAL AXIS ADJUSTMENT METHOD

TECHNICAL FIELD

The present invention relates to a scanning probe microscope and an optical axis adjustment method of the scanning probe microscope.

BACKGROUND OF THE INVENTION

In a scanning probe microscope, a cantilever beam with a probe called cantilever is used. The change in the deflection or the vibration of the cantilever is converted to a change in the reflected light of the laser emitted onto the rear surface of the cantilever to detect the change by a photodetector. In the photodetector, the changes in the position, strength, phase, etc., of the reflected light are detected, and the changes are converted into various physical information (see, for example, Patent Document 1 (Japanese Unexamined Patent Application Publication No. 2000-346782)).

PRIOR ART DOCUMENT

Patent Document

Patent Document 1: Japanese Unexamined Patent Application Publication No. 2000-346782

SUMMARY OF THE INVENTION

Problems to be Solved by the Invention

In a scanning probe microscope, prior to perform measurement, in some cases, it is required to adjust the optical axis of the laser light so that the laser light is correctly emitted to the rear surface of the cantilever. In such a case, since the the cantilever is small, the tolerance of the adjustment is in the order of microns. Therefore, the manual optical axis adjustments are difficult and cumbersome.

It is therefore an object of the present invention to provide a scanning probe microscope capable of easily performing an optical axis adjustment and an optical axis adjustment method of the scanning probe microscope.

Means for Solving the Problem

A scanning probe microscope according to one aspect of the present invention is provided with:
a cantilever provided with a probe at a tip end portion thereof;
an optical system configured to emit laser light onto the cantilever and detect the laser light reflected by the cantilever when performing measurement;
an imaging unit configured to image a range including a position of a tip end of the cantilever when adjusting an optical axis of the laser light;
an image processing unit configured to detect a position of a tip end of the probe and a position of a spot of the laser light, from an image generated by the imaging unit;
an optical axis adjustment unit configured to adjust the optical axis of the laser light, based on detected positions; and
a sample holder configured to hold a sample, wherein the sample holder includes a mirror.

Preferably, the sample holder includes a sample stage capable of being placed on an upper side of the mirror. With this, it is possible to prevent the mirror from being damaged due to the direct placement of a sample on the mirror.

Preferably, a gap is formed between the mirror and the sample stage. With this, it is possible to further prevent the mirror from being damaged.

With this, the optical axis adjustment can be performed easily. Preferably, the sample stage is made of metal, and the sample holder further includes a magnet arranged below the mirror.

With this, it is possible to fix the sample stage with the magnet. Preferably, the scanning probe microscope further includes a scanner. The sample holder is composed of an attachment capable of being attached to the scanner and the sample stage. The mirror is formed on an upper surface of the attachment. A magnet is buried in the attachment.

With this, at the time of the optical axis adjustment, it is possible to make a state in which the sample stage cannot be placed on the mirror. Therefore, the laser light can be reflected by the mirror.

Preferably, the scanner is provided with a fitting hole of a cylindrical shape. The attachment has a disc-shaped upper surface and a cylindrical protrusion. The protrusion is configured to be fitted to the fitting hole.

With this, the attachment can be attached the scanner.

In the optical axis adjustment method of a scanning probe microscope according to the present invention, the scanning probe microscope is provided with:
a cantilever provided with a probe at a tip end portion thereof;
an optical system configured to emit laser light onto the cantilever and detect the laser light reflected by the cantilever when performing measurement;
a scanner configured to move a sample; and
a sample holder configured to hold the sample, wherein the sample holder includes:
an attachment capable of being attached to the scanner, the attachment including a mirror formed on an upper surface and a magnet buried inside thereof; and
a metallic sample stage capable of being placed above the mirror.

The optical axis adjustment method includes the steps of:
making a state in which the sample stage is not placed above the mirror;
emitting the laser light by the optical system;
imaging a region including a position of a tip end of the cantilever;
detecting a position of a tip of the probe and a position of a spot of the laser light from an image generated by the imaging; and
adjusting an optical axis of the laser light based on the detected positions.

With this, the optical axis adjustments can be performed without placing a sample higher in reflectance than the observation target.

Effects of the Invention

According to the present invention, it is possible to easily perform the optical axis adjustment.

EMBODIMENTS FOR CARRYING OUT THE INVENTION

Hereinafter, embodiments will be described with reference to the drawings. The invention of this application is described below.

A manual optical axis adjustment is difficult. Therefore, it is conceivable to automatically perform the optical axis adjustment to facilitate the optical axis adjustment.

In the optical axis automatic adjustment, for example, it is conceivable to observe a cantilever and a spot of the beam of the laser light by the imaging unit, such as, e.g., an optical microscope and a CCD (Charge Coupled Device) and automatically move the optical parts, the laser light source, or the cantilever so that the spot of the beam is illuminated on the rear surface of the cantilever.

However, in an optical axis automatic adjustment, when the reflectance of a surface of a sample placed below a cantilever is low, the reflected light quantity of the laser incident on the imaging unit is small, so that the imaging unit cannot properly detect the position of the laser spot. For this reason, when adjusting the optical axis, it is required to arrange a sample having a higher reflectance than that of an observation target or a mirror. The operation of arranging a sample having a higher reflectance than that of the observation target or or a mirror when adjusting the optical axis is laborious, which complicates the operation before the measuring. Under the circumstances, the inventor of this application has investigated configurations and methods that allow an optical axis automatic adjustment without placing a sample having a higher reflectance than an observation target or a mirror during the optical axis adjustment.

Figure 1:
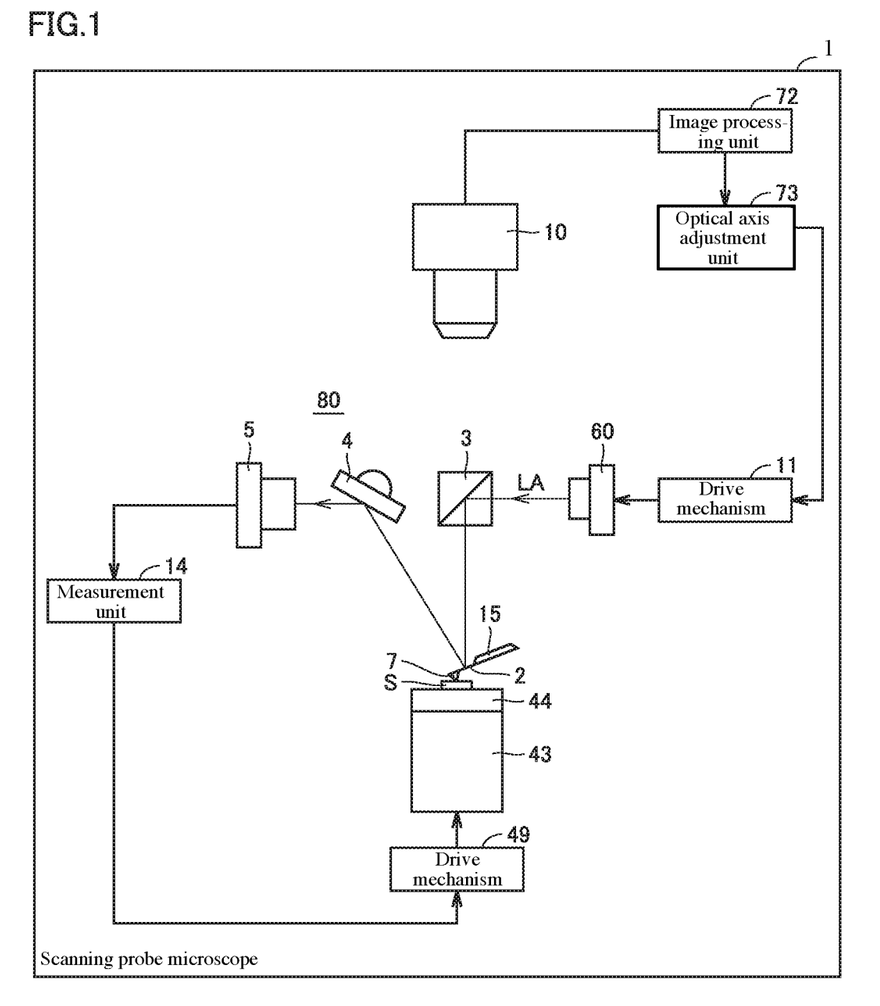
FIG. 1 is a diagram showing a configuration of a scanning probe microscope 1 of an embodiment.

FIG. 1 is a diagram showing a configuration of a scanning probe microscope 1 of this embodiment. The scanning probe microscope 1 according to an embodiment is provided with an imaging unit 10, an image processing unit 72, an optical axis adjustment unit 73, an optical system 80, a cantilever 2, a measurement unit 14, a drive mechanism 49, a scanner 43, a sample holder 44, and a drive mechanism 11.

The cantilever 2 has a probe 7 at its free end. A sample S is arranged to face a probe 7. The atomic force (attraction force or repulsive force) between the probe 7 and the sample S causes a displacement of the cantilever 2. The sample S is placed on the sample holder 44.

At the time of a measurement, the optical system 80 emits laser light onto the rear surface of the cantilever 2 and detects the laser light reflected on the rear surface of the cantilever 2. The optical system 80 can detect the deflection of the cantilever 2. The optical system 80 is provided with a laser light source 60, a beam splitter 3 which is a first mirror, a reflector 4 which is a second mirror, and a photodetector 5. The laser light source 60 is constituted by a laser oscillator or the like that emits a laser beam LA. The photodetector 5 is constituted by a photodiode or the like that detects the laser light to be incident. The laser light emitted from the laser light source 60 is reflected by the beam splitter 3 and is incident on the cantilever 2. The laser light is reflected by the cantilever 2, further reflected by the reflector 4, and incident on the photodetector 5. By detecting the laser light by the photodetector 5, the displacement of the cantilever 2 can be measured.

The drive mechanism 11 adjusts the optical axis of the laser light by changing the position of the laser light source 60.

The measurement unit 14 measures the characteristic of the sample S, based on the displacement of the cantilever 2 obtained by the change in the position of the laser light detected by the optical system 80. For example, the measurement unit 14 generates a force curve that represents the time variation of the acting force from the time variation of the displacement of the cantilever 2. The measurement unit 14 transmits a control signal to drive the drive mechanism 49 for driving the scanner 43.

The drive mechanism 49 changes the relative positional relation between the sample S placed on the scanner 43 and the probe 7 by driving the scanner 43.

The imaging unit 10 images the range including the position of the probe 7 when adjusting the optical axis of the laser light. The imaging unit 10 is composed of an optical microscope, a CCD camera, a CMOS (Complementary Metal Oxide Semiconductor) camera, etc.

The scanner 43 is driven in three-dimensional directions by the drive mechanism 49. The scanner 43 is constituted by a piezoelectric element which is deformed by a voltage applied from an outside.

The sample holder 44 is configured to place a sample S thereon. The sample holder 44 is configured to be attachable to the scanner 43.

The image processing unit 72 identifies the position of the spot SP of the laser light and the position of the tip end TP of the cantilever 2, based on the captured image output from the imaging unit 10.

The optical axis adjustment unit 73 adjusts the optical axis by changing the position of the laser light source 60 by controlling the drive mechanism 11, based on the position of the spot SP of the laser light specified by the image processing unit 72 and the position of the tip end of the cantilever.

Figure 2:
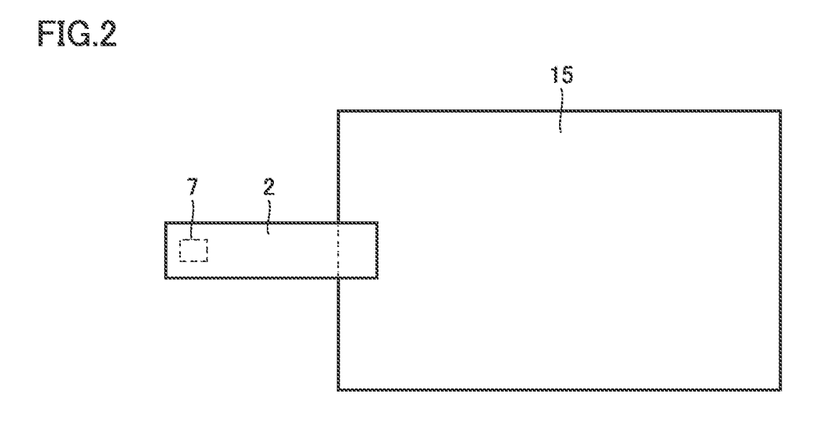
FIG. 2 is a diagram showing a probe 7, a cantilever 2, and a holder 15.

FIG. 2 is a diagram showing the probe 7, the cantilever 2, and the holder 15. As shown in FIG. 2, the probe 7 is attached to the tip end of the cantilever 2. The holder 15 is a member for supporting the cantilever 2.

Figure 3:
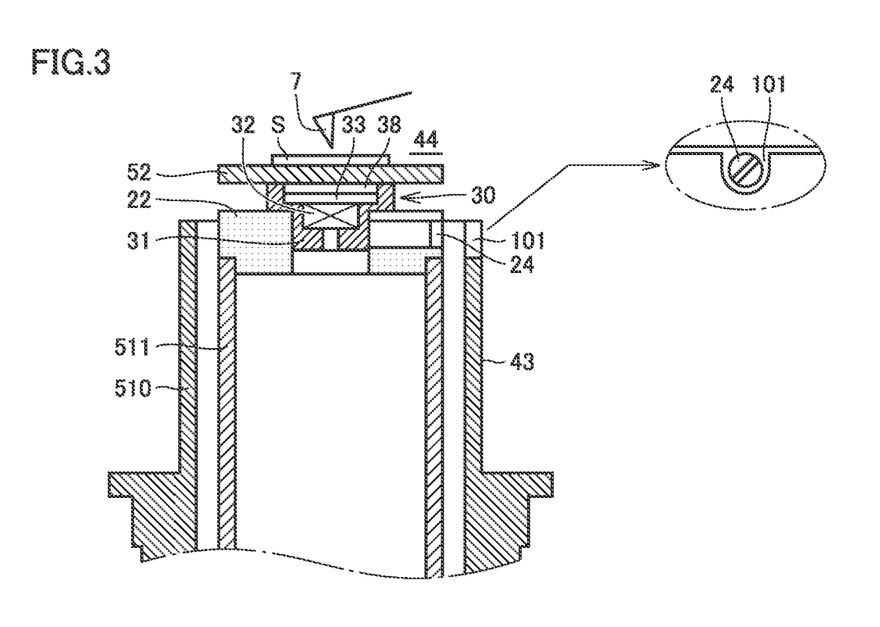
FIG. 3 is a longitudinal cross-sectional view of an upper portion of a scanner 43 and a sample holder 44 when performing a sample observation in the scanning probe microscope 1.
Figure 4:
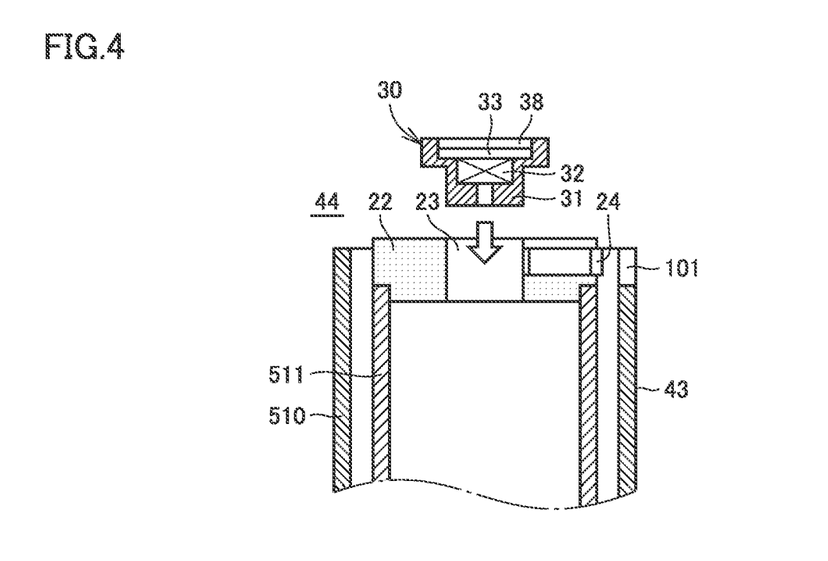
FIG. 4 is a diagram showing a state prior to mounting a stub-type attachment 30 included in the sample holder 44 to the scanner 43.
Figure 5:
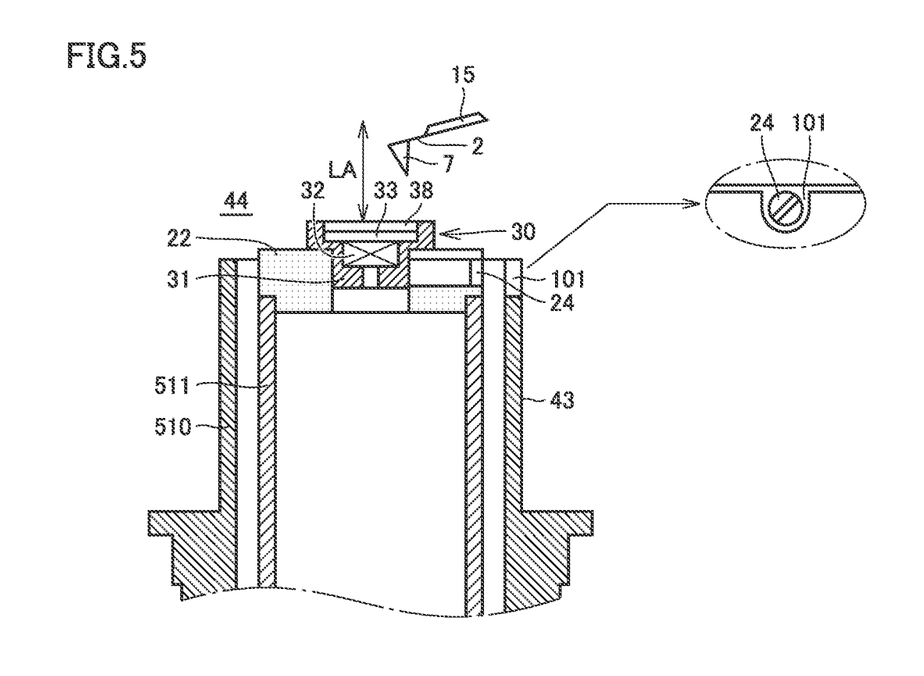
FIG. 5 is a longitudinal cross-sectional view of the upper portion of the scanner 43 when performing an optical axis adjustment in the scanning probe microscope 1.

FIG. 3 is a longitudinal cross-sectional view of the upper portion of the scanner 43 and the sample holder 44 when performing a sample observation in the scanning probe microscope 1. FIG. 4 is a diagram showing a state before mounting the stub-type attachment 30 included in the sample holder 44 to the scanner 43. FIG. 5 is a longitudinal cross-sectional view of the upper portion of the scanner 43 when performing an optical axis adjustment in the scanning probe microscope 1.

At the upper end surface of the piezoelectric tube 511 of the scanner 43, a substantially doughnut-shaped pedestal portion 22 having a cylindrical fitting hole 23 in the center is fixed. A fixing screw 24 is screwed in a horizontal direction in the peripheral surface of the pedestal portion 22. A scanner housing 510 is formed with a notch 101 so that the fixing screw 24 can be rotated from the lateral direction.

The sample holder 44 includes a stub-type attachment 30 and a sample stage 52. In the stub-type attachment 30, a protrusion 31 is formed on a lower side, and the disk-shaped mirror 33 is formed on the upper surface. In the stub-type attachment 30, a magnet 32 is buried inside. The stub-type attachment 30 is made of aluminum.

The protrusion 31 of the stub-type attachment 30 is inserted into the fitting hole 23 of the pedestal portion 22. By tightening the fixing screw 24, the stub-type attachment 30 can be fixed to the pedestal portion 22.

The sample stage 52 can place a sample S thereon. The sample stage 52 is made of metal and has a disk shape.

When observing a sample, the sample stage 52 is placed on the upper side of the mirror 33. The sample stage 52 can be fixed by the attractive force of the magnet 32 in the stub-type attachment 30. A gap 38 is formed between the mirror 33 and the sample stage 52. This can prevent the mirror 33 from being damaged by the sample stage 52.

When adjusting the optical axis, the sample stage 52 is not placed on the mirror 33. The laser light is not blocked by the sample stage 52 and is incident on the mirror 33. The reflected laser light is not blocked by the sample stage 52 and is incident on the imaging unit 10.

Figure 6:
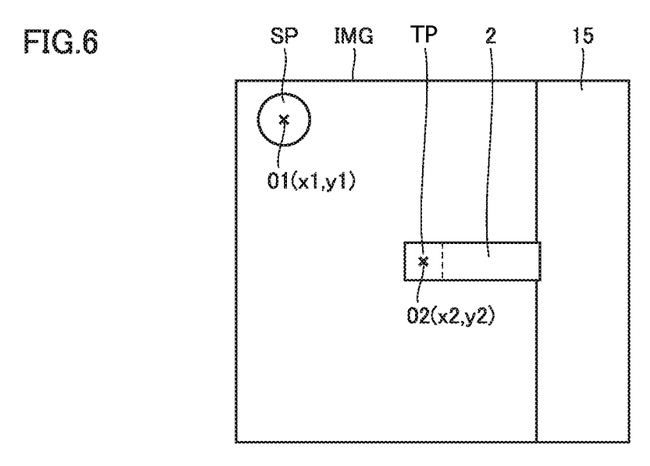
FIG. 6 is a diagram showing an example of a captured image IMG.

FIG. 6 is a diagram showing an example of the captured image IMG.

The captured image IMG include the tip end TP of the cantilever 2 and the spot SP of the beam of the laser light. From the position (x1, y1) of the pixel at the center O1 of the spot SP of the beam of the laser light and the position (x2, y2) of the pixel at the center O2 of the tip end TP of the cantilever 2, it is possible to specify the movement direction and the moving amount of the laser light source 60 so that the center O1 of the spot SP of the beam of the laser light coincides with the center O2 of the tip end TP of the cantilever 2.

Figure 7:
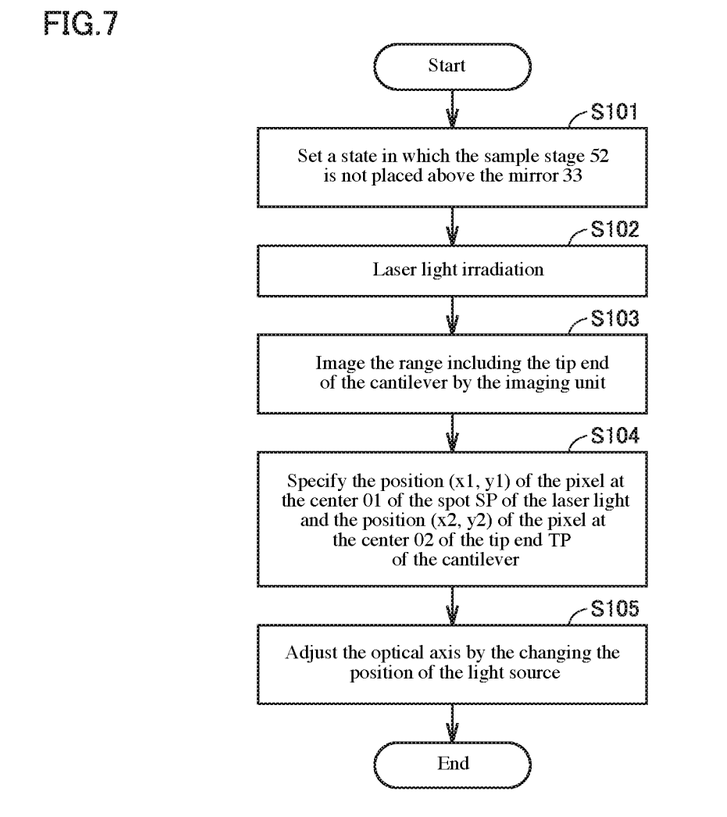
FIG. 7 is a flowchart showing optical axis adjustment procedures of laser light according to an embodiment.

FIG. 7 is a flowchart showing the optical axis adjustment procedures of the laser light of the embodiment. This optical axis regulation is performed, for example, when replacing the cantilever 2 and before measuring the physical properties of the sample S.

In Step S101, it is set a state in which the sample stage 52 is not placed above the mirror 33 of the stub-type attachment 30.

In Step S102, the laser light source 60 emits laser light. In Step S103, the imaging unit 10 images the range including the tip end of the cantilever 2.

In Step S104, the image processing unit 72 specifies the position (x1, y1) of the pixel of the center O1 of the spot SP of the laser light and the position of the pixel of the center O2 of the tip end TP of the cantilever 2 (x2, y2) in the captured image output from the imaging unit 10.

In Step S105, the optical axis adjustment unit 73 outputs a control signal for controlling the drive mechanism 11 to move the laser light source 60 based on (x1, y1) and (x2, y2) so that the position of the center O1 of the spot SP of the laser light coincides with the position of the center O2 of the tip end of the cantilever 2 to which the probe 7 is attached. The drive mechanism 11 adjusts the optical axis of the laser light by changing the position of the laser light source 60 in accordance with the control signal.

As described above, according to this embodiment, when adjusting the optical axis of the laser light, the sample stage 52 is removed so that the laser light is incident on the mirror 33, the laser light is reflected. This allows the imaging unit to detect the lasing spot, thereby eliminating the need to place a sample higher in the reflectance than the observation target or a mirror when adjusting the optical axis of the laser light. In this embodiment, since a sample is not placed directly on the mirror and the mirror can be prevented from being damaged. Since a gap is formed between the sample stage and the mirror, it is possible to further prevent the mirror from being damaged.

(Modifications)

The present invention is not limited to the above-described embodiment and includes, for example, the following modifications.

(1) Sample Stage

In the above-described embodiment, the sample holder includes a sample stage, and a sample is placed on the sample stage, but the present invention is not limited thereto. It may be configured such that the mirror surface is coated to avoid the damage of the mirror surface and a sample is directly placed on a mirror surface.

(2) Gap

In the above-described embodiment, a gap is formed between the mirror and the sample stage, but the present invention is not limited thereto. A sample stage may be placed directly on the mirror.

(3) Optical Axis Adjustment Placement

To adjust an optical axis of the laser light, the drive mechanism 11 has changed the position of the laser light source 60, but the present invention is not limited thereto. It may be configured such that another drive mechanism adjusts the optical axis of the laser light by changing the position of the holder 15 supporting the cantilever 2. Alternatively, another drive mechanism may adjust the optical axis of the laser light by changing the position of the beam splitter 3.

(4) Image Processing Unit and Optical Axis Adjustment Unit

Figure 8:
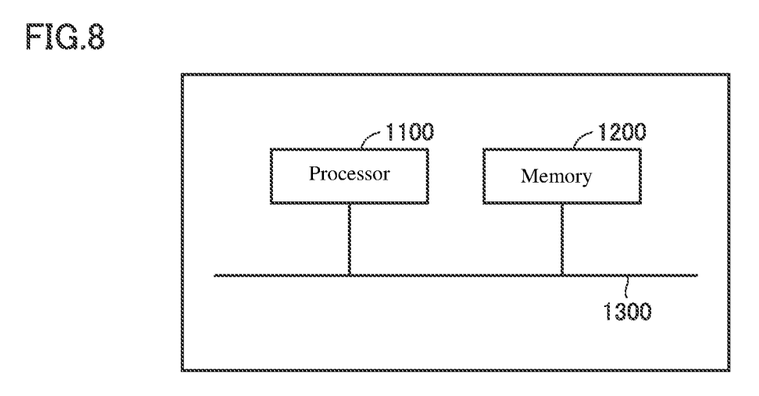
FIG. 8 is a diagram showing an example of a hardware configuration of an image processing unit 72 and an optical axis adjustment unit 73.

FIG. 8 is a diagram showing an example of a hardware configuration of the image processing unit 72 and the optical axis adjustment unit 73. The hardware of the image processing unit 72 and the optical axis adjustment unit 73 is provided with a processor 1100 and a memory 1200 connected to the processor 1100 via a bus 1300.

The image processing unit 72 and the optical axis adjustment unit 73 are realized by executing a program stored in the memory 1200 by the processor 1100, such as, e.g., a CPU (Central Processing Unit). In addition, a plurality of processors and a plurality of memories may be combined to perform the function of the above-described components.

The embodiments disclosed herein are to be considered in all respects as illustrative and not restrictive. The scope of the present invention is indicated by the appended claims rather than by the foregoing descriptions, and is intended to include all modifications within the meanings and ranges equivalent to the scope of the claims.

DESCRIPTION OF SYMBOLS

1: Scanning probe microscope
2: Cantilever
3: Beam splitter
4: Reflector
5: Photodetector
7: Probe
10: Imaging unit
11, 49: Drive mechanism
14: Measurement unit
15: Holder 22: Pedestal portion
23: Fitting hole
24: Fixing screw
30: Stub-type attachment
31: Protrusion
32: Magnet
33: Mirror
38: Gap
43: Scanner
44: Sample holder
52: Sample stage
60: Laser light source
72: Image processing unit
73: Optical axis adjustment unit
80: Optical system
101: Notch
510: Scanner housing
511: Piezoelectric tube
1100: Processor
1200: Memory
S: Sample

The invention claimed is:

1. An optical axis adjustment method of a scanning probe microscope, wherein the scanning probe microscope comprises:

a cantilever provided with a probe at a tip end portion thereof;

an optical system configured to emit laser light onto the cantilever and detect the laser light reflected by the cantilever when performing a measurement of a sample; and a sample holder configured to hold the sample, the sample holder including a mirror and a sample stage capable of being placed above the mirror, and wherein the optical axis adjustment method comprising the steps of:

making a state in which the sample stage is not placed above the mirror;

emitting the laser light by the optical system;

imaging a region including a position of a tip end of the cantilever;

detecting a position of a tip end of the probe and a position of a spot of the laser light from an image generated by the imaging; and adjusting an optical axis of the laser light based on the detected positions, and wherein the mirror is disposed below the sample stage when performing a measurement of the sample.

* * * * *